United States Patent [19]

Preller et al.

[11] 3,926,285
[45] Dec. 16, 1975

[54] MOUNTING DEVICE FOR A BRAKE DISK

[75] Inventors: Fritz Preller; Franz Prahl, both of Munich, Germany

[73] Assignee: Knorr-Bremse GmbH, Munich, Germany

[22] Filed: Feb. 6, 1975

[21] Appl. No.: 547,740

[30] Foreign Application Priority Data
Feb. 13, 1974   Germany.............................. 7404882

[52] U.S. Cl................ 188/218 XL; 29/237; 29/256; 29/282; 29/427
[51] Int. Cl.²......................................... F16D 65/12
[58] Field of Search........ 188/218 XL; 29/234, 237, 29/256, 282, 427

[56] References Cited
UNITED STATES PATENTS

| | | | |
|---|---|---|---|
| 2,916,813 | 12/1959 | Belanger............................ | 29/427 X |
| 2,976,069 | 3/1961 | Meredith........................... | 29/427 X |
| 3,507,370 | 4/1970 | Falch............................ | 188/218 XL |
| 3,550,241 | 12/1970 | Villo.................................. | 29/427 X |
| 3,606,937 | 9/1971 | Falch et al..................... | 188/218 XL |

FOREIGN PATENTS OR APPLICATIONS

| | | | |
|---|---|---|---|
| 909,971 | 11/1962 | United Kingdom.......... | 188/218 XL |
| 1,151,276 | 7/1963 | Germany..................... | 188/218 XL |

*Primary Examiner*—Trygve M. Blix
*Assistant Examiner*—Edward R. Kazenske
*Attorney, Agent, or Firm*—Edmund M. Jaskiewicz

[57] ABSTRACT

A brake disk has an annular braking element which is detachably mounted to a hub by a plurality of clamping sleeves passing through radial bores in extensions on the annular element and received in corresponding radial holes formed in the hub. At the bottom of each hub hole is a nut against which the end of the sleeve rests. To remove the sleeve, a bolt is inserted within the sleeve and threaded into the nut so that pulling of the bolt outwardly removes the sleeve from the openings.

8 Claims, 3 Drawing Figures

MOUNTING DEVICE FOR A BRAKE DISK

The present invention relates to disk brakes for railway and other vehicles, more particularly, to the detachable mounting of a brake disk on a hub.

A disk brake, particularly for railway vehicles, generally consists of a disk mounted on the axle of the rail vehicle and positioned so that brake shoes can be pressed from both sides onto the lateral surfaces of the brake disk.

Such a brake disk is preferably made of cast iron and particularly gray cast iron having a pearlitic texture or spheroidalgraphite cast iron. Such material has been particularly advantageous since it possesses sufficient hardness and strength and also has a relatively rough surface to produce a good braking action. Such a brake disk also has sufficient rigidity to avoid flutter which would in turn generate noise and cause a rapid wear of the disk. The mounting of such a brake disk to the wheel axle presented some difficulties since the brake disk may be heated to a relatively high temperature during the braking operation. This heating in turn affected its mounting on the wheel axle which was preferably a shrink-fit.

In an attempt to avoid these difficulties it was proposed to make the brake disk in two parts consisting of a hub of cast steel or a structure welded from steel components. The hub was then attached securely to the axle preferably through a shrink-fit. The brake disk also comprised the outer brake disk annular element consisting of a pearlitic cast iron and attached to the hub. The annular element carried the braking surfaces and was mounted to the hub by means of a plurality of heavy clamping sleeves or bolts received in radial extensions provided both on the hub and the annular brake disk element. These extensions are aligned with each other and were provided with aligned bores into which the clamping sleeves were inserted. The clamping sleeves were held in position by transversely positioned rivets or hollow pins which might have a flanged head.

The advantages of such a two-piece braking disk included the use of different materials which were particularly suitable for the specific functions of each component of the brake disk. The cast steel for the hub needed only to have the property of a good shrink-fit on the axle while the annular element needed to have the property of good braking action. Further, this two-piece arrangement had the advantage of facilitating the repair and replacement of worn brake disks. With such a structure it was not necessary to remove the entire disk assembly which was shrink-fitted onto the axle but the hub remained shrink-fitted upon the axle while merely the outer annular brake disk was removed to be replaced. The annular brake disk was removed merely by removing the heavy clamping sleeves from their bores to detach the annular element from the hub.

Under actual operating conditions, however, difficulties have been encountered in that because of the rough operations of railway vehicles the heavy clamping sleeves become rusted into the radial extensions to produce an almost undetachable connection between the hub and the brake disk annular element. The holes in the extensions on the hub generally consist of blind holes having a bottom in order to prevent any detrimental effect such as by weakening of the structure of the hub. It is, of course, impossible to avoid the deposit of dust, dirt and abraded particles in such blind holes. Further, it would not be feasible to provide recesses at the lower ends of the blind holes, such as behind the heavy clamping sleeves, so that the recesses could be engaged by conventional devices used for removing such sleeves. It has also been noted that as a consequence of thermal stresses occurring during the braking operation the heavy clamping sleeves have the tendency of moving toward the center of the hub. Thus, for this reason a recess behind the clamping sleeves would not be a solution to the problem because of the movement of the clamping sleeves into the recesses.

It is therefore the principal object of the present invention to provide a novel and improved brake disk for a disk brake for railway and other vehicles wherein the brake disk can be readily removed and replaced.

It is another object of the present invention to provide in a disk brake for railway and other vehicles a brake disk comprising a hub secured to the axle and a brake disk annular element that is detachably mounted to the hub.

It is a further object of the present invention to provide a brake disk comprising a hub mountable on the axle and a brake disk annular element that is so connected to the hub that the annular element can be readily replaced even after long periods of operation and inspite of any rusting or corrosion of the components for mounting the annular element.

According to one aspect of the present invention a brake disk for a disk brake for a railway and other vehicles may comprise a hub which is fixedly mounted on an axle and a brake disk annular element which is detachably connected to the hub. The annular element comprises a pair of spaced brake rings having radial cooling ribs therebetween. There are a plurality of radial extensions on the annular element and there is a radial bore through each such extension. The hub is provided with a corresponding plurality of radial extensions and each radial extension has a radial hole therein which is aligned with a corresponding radial bore in the radial extensions on the annular element. In the bottom of each hub radial hole there is a nut and a sleeve passes through a radial bore into an aligned hole to contact the nut on the bottom of the hole.

In order to remove the sleeve, a bolt is threaded into the nut so that pulling of the bolt outwardly will bring the nut and the sleeve with it.

Other objects and advantages of the present invention will be apparent upon reference to the accompanying description when taken in conjunction with the following drawings, which are exemplary, wherein.

Processing next to the drawings wherein like reference symbols indicate the same parts throughout the various views a specific embodiment of the present invention will be described in detail.

Figure 1:
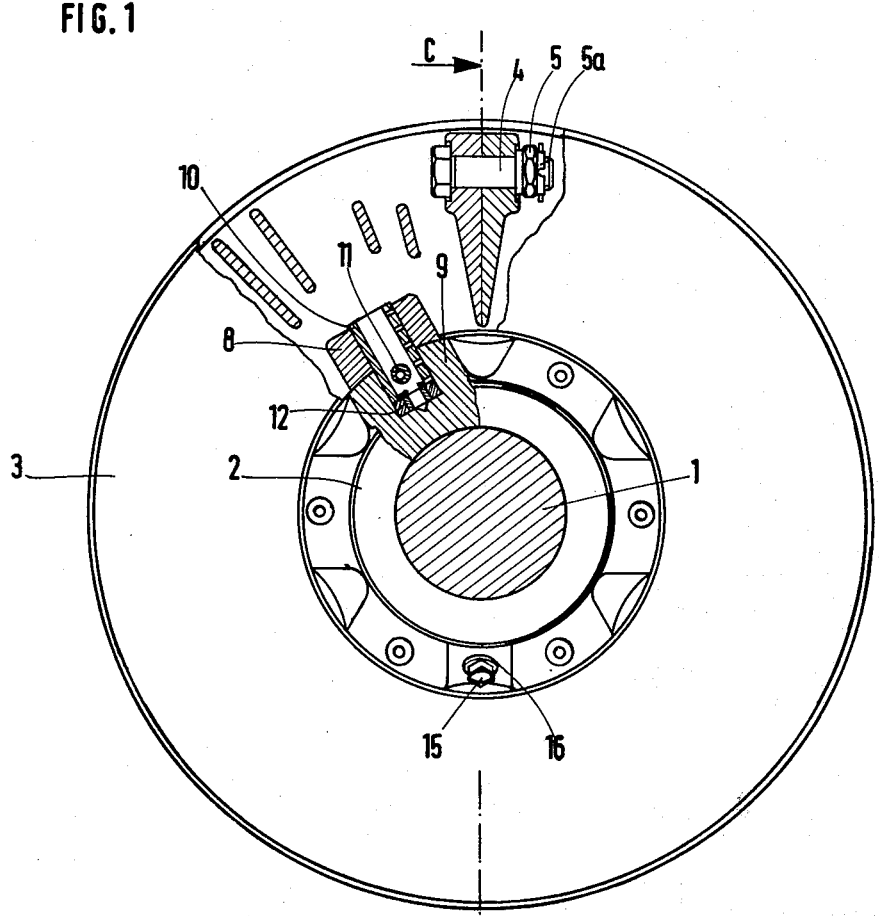
FIG. 1 is a side elevational view of a brake disk according to the present invention with portions thereof being shown in section.

As may be seen in FIG. 1, a wheel axle 1 has an inner support element 2 in the form of a hub shrink-fitted thereon so as to be securely and rigidly positioned on the axle. An annular brake disk 3 is mounted on the hub 2 in a manner as will be subsequently described in greater detail. The brake disk 3 may comprise two havles divided along an axial plane C-D and connected together to form an annular element as known in the art by means of a bolt 4 on which is a nut 5 and a retaining ring 5a. The brake disk 3 may also comprise a unitary undivided disk but the brake disk structure consisting of two halves has the advantage that during the replacement of the brake disk it is not necessary to remove the wheels from the axle 1. Two brake disk halves may be mounted on the hub 2 after the halves have been assembled by means of bolts 4 and nuts 5.

Figure 2:
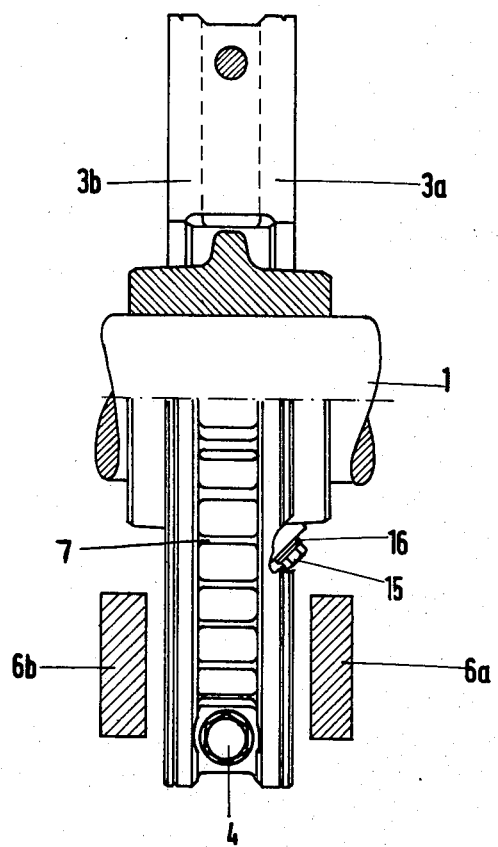
FIG. 2 is a sectional view taken along the line C-D of FIG. 1.

The brake disk annular element 3 comprises two brake disk rings 3a and 3b of a gray cast iron or a pearlitic cast iron to form a single cast element as can be seen in FIG. 2. The outer faces of the rings 3a and 3b which are away from each other function as the braking surfaces and are engaged by brake shoes 6a and 6b suspended by a suitable linkage and actuated in a manner as known in the art.

The inner surfaces of the brake disks 3a and 3b which are directed toward each other are provided with a plurality of radial cooling or reinforcing ribs 7 that may also be used to at least partially interconnect the two brake disks 3a and 3b. The brake disks 3a and 3b when connected to each other have a plurality of radial extensions 8 each having a bore 8a therethrough. In the present embodiment there are provided six such extensions. The hub 2 is provided with a like number of radial extensions 9 each of which is provided with a blind hole 9a which is aligned with a corresponding bore 8a when the annular element is assembled upon the hub 2.

In assembling the brake disk of the present invention, the annular element 3 is mounted upon the hub 2 so that the corresponding bores 8a of the annular element are aligned with the holes 9a on the hub. A heavy clamping sleeve 10 is inserted into each aligned bore and hole. Prior to the insertion of the sleeve 10, a nut 12 is positioned in the bottom of each blind hole 9a. The nut is provided with a projecting annular shoulder 13 surrounding its threaded bore for use in centering the sleeve 10. The nut 12 is preferably made of a rust-proof material, such as fine steel, and the sleeve 10 is preferably made of the same material. In addition, or instead of making the nut and sleeve of such a material these two components may be coated with a rust-preventing paste, such as Molykote. The threaded bore of the nut 12 may be filled entirely with such a rust-preventing substance.

Upon insertion of the sleeve 10 into the aligned bore and hole so as to rest upon the nut 12 a hollow pin or rivet 11 is then passed transversely through the hub extension 9 and sleeve 10 so as to retain the sleeve 10 in position.

Figure 3:
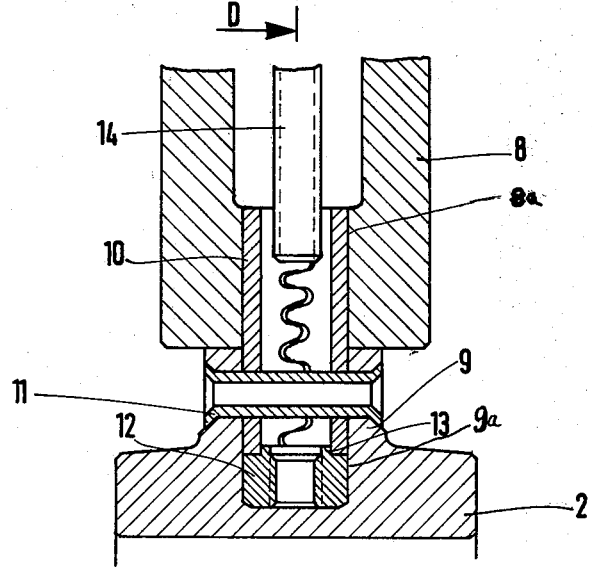
FIG. 3 is a radial sectional view in enlarged scale through the aligned extensions on the annular element and hub of FIG. 1 to show the mounting of the annular element on the hub.

The mounting of the brake disk annular 3 on the hub 2 is shown in greater detail in FIG. 3 wherein it is apparent that the radial extension 8 of the annular element 3 is aligned with extension 9 on the hub 2. The heavy clamping sleeve 10 interconnecting the two extensions 8 and 9 is retained in position by a transverse rivet or pin 11. The shoulder 13 on the nut 12 assists in centering the sleeve 10 during the insertion thereof and for this purpose the outer diameter of the shoulder 13 corresponds to the inner diameter of the sleeve 10.

In order to remove the brake disk 3, the hollow pin 11 is bored or punched out. A threaded bolt 14 is then inserted into the sleeve 10 so as to be threaded into the threaded bore of the nut 12. The bolt 14 is then withdrawn radially outwardly with respect to the hub and takes the nut 12 along with it. The nut 12, having a greater outside diameter than the inside diameter of the sleeve 10, bearing against the bottom end of the sleeve 10 also carries the sleeve 10 along such that upon removal of the sleeve 10 the brake disk annular element 3 is separated from the hub 2.

In FIGS. 1 and 2 there is shown a bolt 15 and a sealing ring or washer 16 on the hub 2. This bolt and ring close off a cavity that might possibly be provided on the hub 2 and used for pressing off of the hub 2 from the axle 1 by the introduction of a fluid under pressure, such as oil or a hydraulic fluid.

While the present invention has been described in connection with a disk brake on a railway vehicle it is to be borne in mind that the invention can be applied to disk brakes on motor vehicles. Thus it is apparent that the present invention provides a simple yet effective structure for detachably mounting a brake disk annular element upon a hub. This mounting device facilitates removal of the brake disk element when it is necessary to replace this element. As a result, the brake disk can be replaced in considerably less time than was previously possible.

It will be understood that this invention is susceptible to modification in order to adapt it to different usages and conditions, and accordingly, it is desired to comprehend such modifications within this invention as may fall within the scope of appended claims.

What is claimed is:

1. A brake disk for a disk brake for vehicles comprising a hub for mounting on an axle, a brake annular element detachably connected to said hub, said annular element comprising a pair of spaced brake rings with radial cooling ribs therebetween, a plurality of radial extensions on said annular element and there being a radial bore through each said extension, a corresponding plurality of radial extensions on said hub and each hub radial extension having a radial hole therein aligned with a corresponding radial bore in said annular element radial extensions, a threaded nut on the bottom of each said hub radial hole, and a sleeve passing through each said radial bore into an aligned said hole to contact a said nut on the bottom thereof, said nut having a greater outside diameter than the inside diameter of said sleeve.

2. A brake disk as claimed in claim 1 wherein said nut comprises a rust-proof material.

3. A brake disk as claimed in claim 1 wherein said sleeve comprises a rust-proof material.

4. A brake disk as claimed in claim 1 and a rust-preventing substance in said nut and sleeve.

5. A brake disk as claimed in claim 4 wherein the threaded bore of said nut is filled with said rust-preventing substance.

6. A brake disk as claimed in claim 1 wherein said nut has an annular shoulder insertable within an end of said sleeve to center the same.

7. A brake disk as claimed in claim 1 and a hollow pin passing transversely through said hub extension and through the sleeve received therein.

8. A brake disk as claimed in claim 1 and a bolt threaded into said nut such that pulling of the bolt outwardly removes the sleeve from the hub hole and radial bore.

* * * * *